US009772776B2

(12) United States Patent
Tsirkin

(10) Patent No.: US 9,772,776 B2
(45) Date of Patent: Sep. 26, 2017

(54) PER-MEMORY GROUP SWAP DEVICE

(71) Applicant: Red Hat Israel, Ltd., Ra'anana (IL)

(72) Inventor: Michael Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 117 days.

(21) Appl. No.: 14/192,621

(22) Filed: Feb. 27, 2014

(65) Prior Publication Data
US 2015/0242121 A1    Aug. 27, 2015

(51) Int. Cl.
| G06F 12/02 | (2006.01) |
| G06F 3/06 | (2006.01) |
| G06F 12/00 | (2006.01) |
| G06F 12/126 | (2016.01) |
| G06F 9/50 | (2006.01) |

(52) U.S. Cl.
CPC .............. *G06F 3/061* (2013.01); *G06F 3/065* (2013.01); *G06F 3/0674* (2013.01); *G06F 9/5016* (2013.01); *G06F 12/00* (2013.01); *G06F 12/126* (2013.01)

(58) Field of Classification Search
CPC .................................................... G06F 12/023
See application file for complete search history.

(56) References Cited

U.S. PATENT DOCUMENTS

| 6,874,046 B1* | 3/2005 | LeCrone | G06F 11/2094 710/20 |
| 2004/0091114 A1* | 5/2004 | Carter | G06F 21/606 380/259 |
| 2008/0177994 A1* | 7/2008 | Mayer | G06F 9/4418 713/2 |
| 2010/0082940 A1* | 4/2010 | Nito | G06F 12/1466 712/28 |
| 2013/0152086 A1* | 6/2013 | Yoo | G06F 9/455 718/1 |

* cited by examiner

Primary Examiner — Charles Rones
Assistant Examiner — Ryan Dare
(74) Attorney, Agent, or Firm — Haynes and Boone, LLP

(57) ABSTRACT

Systems and methods are disclosed for swapping a memory page from memory to a swap device. An example system for swapping a memory page from memory to a swap device includes a memory to store one or more memory pages. The system also includes a swap device selector that receives an indication to swap out a memory page from memory to a swap device. The swap device selector identifies a memory group to which the memory page belongs and selects a swap device from a plurality of swap devices assigned to the identified memory group. The memory group identifies a plurality of applications having a common property. The system further includes a swap module that copies the memory page into the selected swap device.

20 Claims, 4 Drawing Sheets

PER-MEMORY GROUP SWAP DEVICE

BACKGROUND

The present disclosure generally relates to a computer system, and more particularly to sharing a swap device among one or more memory groups.

The available random access memory (RAM) in a computer is seldom enough to meet user needs or to satisfy memory-intensive applications. To solve this problem, operating systems may use a memory management technique called virtual memory, which maps virtual addresses used by a program into physical addresses in computer memory. Virtual memory combines the computer's RAM with temporary space on a swap device. When RAM runs low, virtual memory moves data from RAM to the swap device. Moving data between the RAM and swap device frees up RAM so that the computer can complete its work. With this technique, software within the operating system may provide a virtual address space that can exceed the capacity of real memory and thus reference more memory than is physically present in the computer.

A conventional operating system supports one or more swap devices that may be used to store or swap out virtual memory contents when memory for an application is overcommitted. A swap device is typically shared by all applications executing on the computer. If the operating system supports multiple swap devices and one swap device is full or is unavailable the operating system may fall back on another swap device and store data into the other swap device. The operating system may limit the amount of swap space that a group of applications may consume or may disable the use of swap devices for the group of applications as a whole; this may have limitations. For example, the swap device may be a physical device that has a limited number of interrupts or a limited number of channels for communication with the operating system. Accordingly, it may be difficult to ensure service because a single physical device that is shared among applications can slow down other applications when more than one application is attempting to access the swap device. Swap space may refer to what is used when the amount of RAM is full. If the system needs more memory resources and the RAM is full, inactive pages in memory are moved to the swap space. Swap space may be located on a hard drive, which has a slower access time than physical memory.

Additionally, a conventional operating system may use various memory management techniques to optimize memory resource usage between RAM and a swap device. For example, in the paging memory-management scheme, the operating system retrieves data from the swap device in same-size blocks called memory pages. A page may refer to a memory page. In an example, pages can be moved to RAM or they can be evicted to external storage. Swapping or (paging) is generally known as a performance killer because it can cause high I/O activity on swap devices or files on disk. To counteract this disadvantage, paging may be disabled. When paging is disabled, however, the memory pressure gets higher and the operating system has lower file system cache available because it competes with the process code and data more frequently. One solution to solve this problem may be to put a lot of RAM into the computer to ensure that the amount of RAM is greater than what the applications executing on the computer will ever need; putting this amount of RAM into the machine, however, may be quite expensive.

In the memory-mapped memory-management scheme, an application may invoke a system call that creates a memory mapping. In an example, the system call creates a file mapping that maps a region of a file directly into a calling process's virtual memory. Once a file is mapped, its contents can be accessed by operations on the bytes in the corresponding memory region. An application may obtain a range of memory that is backed by a specific file, which is per application, and may have a high level of control over placement of its data. The application requests access to the specific file and stores this information in the memory that is backed by the specific file. With the memory-mapped memory-management scheme, the application informs the operating system that a particular page is backed by a particular swap device. The particular page may be considered not anonymous and automatically loaded from the file as required.

BRIEF SUMMARY

This disclosure relates to a swap device assigned to a memory group. Methods, systems, and techniques for swapping a memory page from memory to a swap device are provided.

According to an embodiment, a method of swapping a memory page from memory to a swap device includes receiving an indication to swap out a memory page from memory to a swap device. The method also includes identifying a memory group to which the memory page belongs. The memory group identifies a plurality of applications having a common property. The method further includes selecting a swap device from a plurality of swap devices assigned to the identified memory group. The method also includes copying the memory page into the selected swap device.

According to another embodiment, a system for swapping a memory page from memory to a swap device includes a memory to store one or more memory pages. The system also includes a swap device selector that receives an indication to swap out a memory page from memory to a swap device. The swap device selector identifies a memory group to which the memory page belongs and selects a swap device from a plurality of swap devices assigned to the identified memory group. The memory group identifies a plurality of applications having a common property. The system further includes a swap module that copies the memory page into the selected swap device.

According to another embodiment, a non-transitory machine-readable medium includes a plurality of machine-readable instructions that when executed by one or more processors are adapted to cause the one or more processors to perform a method including: receiving an indication to swap out a memory page from memory to a swap device; identifying a memory group to which the memory page belongs, the memory group identifying a plurality of applications having a common property; selecting a swap device from a plurality of swap devices assigned to the identified memory group; and copying the memory page into the selected swap device.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
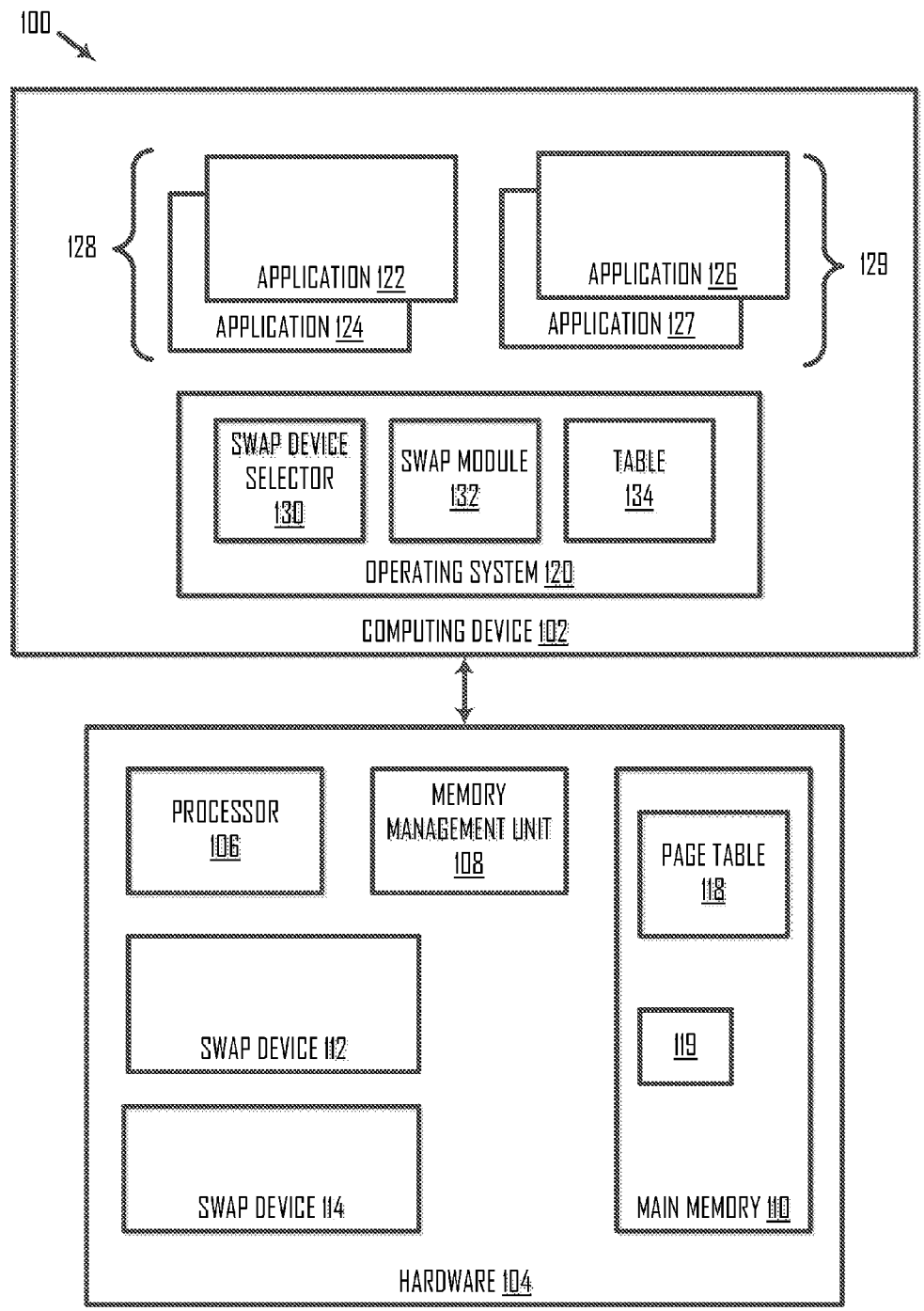
FIG. 1 is a block diagram illustrating a system for swapping a memory page from memory to a swap device, according to an embodiment.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Example System Architecture
A. Virtual Memory
B. Swap Out a Page From Memory
C. Association Between a Page and a Swap Device of a Plurality of Swap Devices
  1. Identify the Memory Context Based on the Page to be Swapped Out
  2. Identify the Memory Group Based on the Memory Context
  3. Select a Swap Device from a Plurality of Swap Devices Assigned to a Memory Group
II. Other Examples
A. Global Swap Device
B. Store Data in an Encrypted or Unencrypted Form
C. Transfer an Application From One Memory Group to Another Memory Group
III. Example Method
IV. Example Computing System It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

I. Example System Architecture

FIG. 1 is a simplified block diagram 100 illustrating a system for swapping a memory page from memory to a swap device, according to an embodiment. Diagram 100 includes a computing device 102 coupled to hardware 104. Computing device 102 may be a workstation, computer, server, game console, set-top box, kiosk, embedded system, mobile device (e.g., a mobile phone, personal digital assistant, tablet, and laptop), or other device having at least one processor and memory.

Computing device 102 may execute one or more applications. For example, computing device 102 may execute applications 122, 124, and/or 126. An application may be a single-threaded application or a multi-threaded application. Computing device 102 includes an operating system 120 that serves as an intermediary layer between hardware 104 and the software (e.g., applications 122, 124, and 126). Computing device 102 may include a general-purpose computer configured to execute any of a variety of operating systems. Operating system 120 may be, for example, a UNIX™, LINUX™, or Microsoft Windows™ operating system. Trademarks are the property of their respective owners. Operating system 120 may share available resources (e.g., CPU time, disk space, and network connections) between various system processes while at the same time ensuring system integrity.

Hardware 104 includes a swap device 112 and swap device 114. A swap device may be any secondary storage device. For example, a swap device may be a physical storage device (e.g., hard disk drive) or a virtual storage device. Hardware 104 also includes a processor 106, memory management unit 108, and main memory 110. Hardware 104 may also include other input/output (I/O) devices. Memory 110 may also be referred to as main memory or RAM.

A. Virtual Memory

Operating system 120 may implement a virtual memory scheme that splits the memory used by each program into small, fixed-size units called pages or page frames. Accordingly, memory 110 may be divided into a series of page frames of the same size and may store one or more pages. The size of a page may be, for example, 4 kilobytes (KB), 8 KB, or larger. A page may refer to the smallest unit of data that is transferred between memory 110 and a swap device. Virtual memory may refer to the conceptual separation of user logical memory from physical memory and enables a page that does not currently reside in memory 110 to be addressed and used. Virtual memory management takes advantage of the possibility that not all pages of a process are needed simultaneously during execution of the process. Therefore, it may be unnecessary to allocate all pages of the process in memory 110. The virtual address space of a process is the entire set of all its addresses in the absolute program. Thus, the physical address space of a process is smaller than its virtual address space. The physical address space of a process is smaller than its virtual addresses because only a portion of the process will ever typically be loaded into memory 110.

A page reference may refer to the page that has the address being referenced. At any one time, only some of the pages of a program may need to be present in physical memory page frames. Copies of the unused pages of a program may be maintained in a swap device, which may refer to a reserved area of space that is used to supplement memory 110, and the copies may be loaded into memory 110 when the data is required by a program. When a process references a page, either as code execution or data access, and that page is not currently present in memory 110, a page fault occurs, at which point operating system 120 suspends execution of the process while the page is loaded from a swap device into memory. One instruction may span several pages (e.g., a block move of data). At some later time, the process resumes execution.

Memory management unit 108 translates virtual memory addresses to physical addresses and advises operating system 120 of a page fault when a particular virtual memory address corresponds to a page that is not present in memory 110. Memory management unit 108 may be implemented as part of processor 106 or as a separate integrated circuit. Memory management unit 108 maintains one or more page tables 118 for each process and may also maintain a translation lookaside buffer. A translation lookaside buffer is a cache that is used to improve the virtual address translation speed.

In FIG. 1, a page table 118 and a page 119 are present in memory 110. It should be understood that a portion of page table 118 may also reside in a swap device. A page table may include the location of each page in the process's virtual address space, which is the set of all virtual memory pages available to the process. Each entry in the page table may indicate the location of a virtual page in memory 110 or may indicate that it currently resides in a swap device. Not all address ranges in a process's virtual address space may require page-table entries. Typically, large ranges of the potential virtual address space are unused, so it is unnecessary to maintain corresponding page-table entries.

In an example, application 122 requests page 119 and writes to it. Accordingly, a particular virtual address in page 119 may be within the virtual address space of application 122's, and a reference to the particular virtual address in page 119 refers to page 119. When application 122 requests the particular virtual address in page 119, memory management unit 108 may check an internal table to determine whether page 119 is present in memory 110. If page 119 is present in memory 110, application 122 may access page 119. If page 119 is not present in memory 110, however, memory management unit 108 may advise operating system 120 of the page fault, and operating system 120 may identify a physical memory location at which to bring page 119 into memory 110. Operating system 120 may then move page 119 into the identified physical memory location so that application 122 may access data stored at the particular virtual address. As will be further discussed below, operating system 120 may need to swap out a page that is currently residing in memory 110 to make room to bring in page 119.

B. Swap Out a Page from Memory

Operating system 120 includes a swap device selector 130, a swap module 132, and a table 134. In an embodiment, swap device selector 130 receives an indication to swap out a page from memory 110 to a swap device. In an example, swap device selector 130 receives the indication to swap out when swap device selector 130 detects that an amount of available memory in memory 110 has satisfied a threshold. For example, when an amount of available memory in memory 110 falls below a threshold and application 122 desires to access a page that is not present in memory 110, swap device selector 130 may receive an indication to swap out a page that is present in memory 110 to a swap device in order to make room for the requested page. Operating system 120 may use a variety of techniques to determine which virtual page(s) to swap out from memory 110 to a swap device. In an example, operating system 120 may use a page aging technique in which each page in computing device 102 has an age that changes when the page is accessed. The more often a page is accessed, the younger the page is; the less often that a page is accessed, the older the page is. In the page aging technique, old pages may be more likely to be swapped out than younger pages. Other techniques for determining which virtual page(s) to swap out from memory 110 to a swap device are within the scope of the disclosure.

In keeping with the above example, when application 122 requests page 119, the request may not be accompanied by an indication of which swap device to store the page to when it is swapped out from memory 110. Accordingly, page 119 may be an anonymous memory page that does not directly refer to a swap device. As such, at a later point in time when operating system 120 determines to swap out page 119 from memory 110 to a swap device, operating system 120 may select a swap device from a plurality of swap devices for the swapping.

C. Association Between a Page and a Swap Device of a Plurality of Swap Devices

Figure 2:
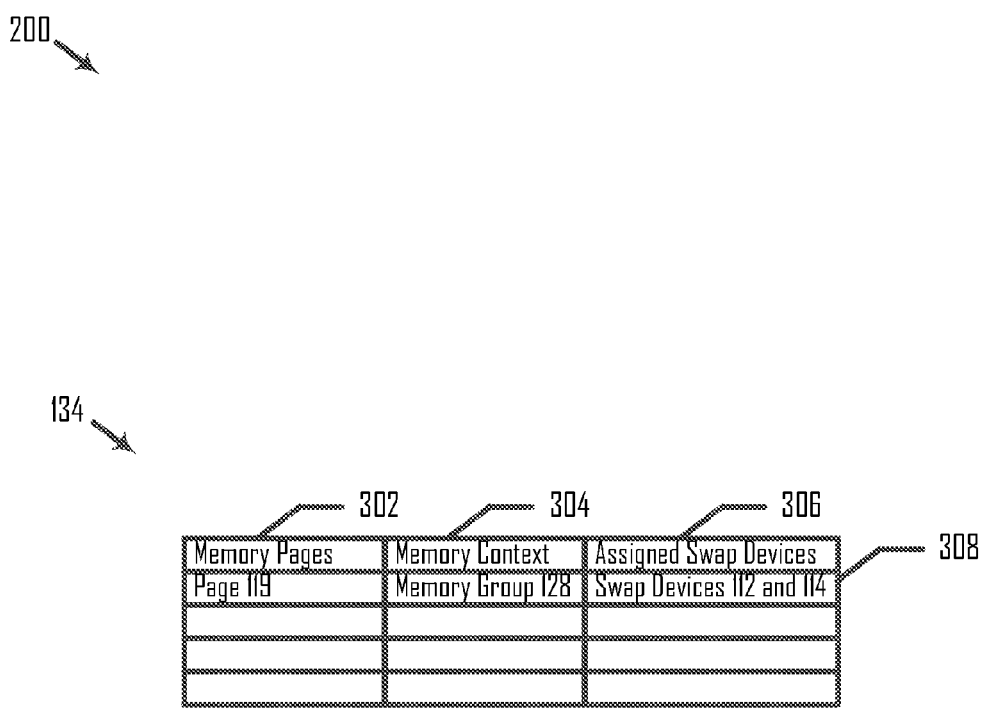
FIG. 2 includes a table storing one or more mappings used by the operating system to select a swap device, according to an embodiment.

Operating system 120 may access table 134 to select a swap device in which to store page 119. FIG. 2 includes table 134 storing one or more mappings used by operating system 120 to select a swap device, according to an embodiment. Table 134 includes three columns, "Memory Pages" column 302 that stores one or more memory pages specific to an application, "Memory Context" column 304 that stores one or more memory groups, and "Assigned Swap Devices" column 306 that stores one or more swap devices. Table 134 may store one or more mappings that map an application to a plurality of swap devices. The plurality of swap devices is assigned to a memory group that identifies the application.

1. Identify the Memory Context Based on the Page to be Swapped Out

A one-to-one relationship exists between an application and a memory context. Each application executable on computing device 102 may have a memory context, and each page tied to the application belongs to the memory context of that application. An application may be prevented from viewing the memory context of another application. In keeping with the above example, application 122 requests page 119 and writes to it. Accordingly, page 119 may belong to and be tied to application 122. Swap device selector 130 identifies a memory context to which page 119 belongs. Table 134 includes an entry 308 that associates page 119 with a memory context that belongs to one or more memory groups. As illustrated in entry 308, page 119, which is tied to application 122, belongs to memory group 128. Although page 119 is shown in table 134 as belonging to one memory group, it should be understood that page 119 may belong to more than one memory group.

2. Identify the Memory Group Based on the Memory Context

Operating system 120 may maintain a list of memory groups that is associated with a memory context. The memory context to which a page belongs maps to one or more memory groups. Accordingly, swap device selector 130 may identify one or more memory groups to which the memory context belongs. In an embodiment, swap device selector 130 identifies a memory group to which page 119 belongs. In an example, swap device selector 130 determines that page 119 belongs to memory group 128 by determining the particular memory context to which page 119 belongs and then determining that the particular memory context maps to memory group 128.

A memory group may be specified by an administrator and identifies one or more applications having a common property. Each application identified in a particular memory group may have a different memory context but may be grouped together nonetheless because the applications in the particular memory group have a common property. In an example, a memory group identifies a plurality of applications having a common property. For example, a memory group may identify one or more applications or threads that share access to a specific address range. In another example, a memory group specifies a total amount of swap space the applications identified in the memory group can use. In such an example, a memory group may include 10 applications and specify that all 10 applications can use at most 10 megabytes (MB) of swap space. If the applications attempt to use more than the specified maximum, the access attempt will fail.

One or more applications may be included in a memory group. In FIG. 1, applications 122 and 124 are included in memory group 128, which identifies applications 122 and 124 as having a common property, and applications 126 and 127 are included in a memory group 129, which identifies applications 126 and 127 as having a common property.

3. Select a Swap Device from a Plurality of Swap Devices Assigned to a Memory Group A plurality of swap devices may be assigned per memory group. The plurality of swap devices may be available for selection to the memory group for storing pages tied to applications identified in the memory group. Swap device selector 130 selects a swap device from a plurality of swap devices assigned to the identified memory group. Swap device selector 130 may start with a page that is to be swapped from memory 110 and identify a plurality of eligible swap devices that may be selected to store the page. Swap device selector 130 may then use one of the swap devices of the plurality of swap devices to store the page. Swap module 132 may then copy the page into the selected swap device.

Swap device selector 130 may select the swap device in a variety of ways. In an example, swap device selector 130 randomly selects the swap device from the plurality of swap devices. In another example, swap device selector 130 selects the swap device with the most available free space of the plurality of swap devices. In another example, the swap devices are assigned a priority by an administrator, and swap device selector 130 selects the swap device based on their priorities. In another example, if the plurality of swap devices includes a global swap device, swap device selector 130 selects the global swap device. If for some reason the selected swap device is not available to store the page, swap device selector 130 may select another swap device from the plurality of swap devices assigned to the memory group. If no swap devices are assigned to a memory group, swap module 132 may disable swap for the page.

II. Other Examples

A. Global Swap Device

In an embodiment, a global swap device is shared between all applications executing in computing device 102. If swap device selector 130 selects a swap device of the plurality of swap devices assigned to a memory group and the selected swap device is unable to store the page, swap device selector 130 may select the global swap device as a fallback to store the page. In an example, swap device selector 130 attempts to first store the page in each of the swap devices assigned to the memory group and if this proves to be unsuccessful, swap device selector 130 selects the global swap device to store the page. In another example, swap device selector 130 selects the global swap device after the first selected swap device is unable to store the page.

B. Store Data in an Encrypted or Unencrypted Form

A swap device may store data in an encrypted form or an unencrypted form, and an encrypted file and an unencrypted file may be mapped to different addresses ranges. Applications may be grouped into a memory group such that sensitive applications are grouped into a memory group that uses encrypted swap devices and other applications that do not access or process sensitive data are grouped into a memory group that uses unencrypted swap devices. Accordingly, a first subset of applications executing in computing device 102 may use an encrypted swap device and a second subset of applications executing in computing device 102 may use an unencrypted swap device. The first subset of applications is different from the second subset of applications.

In an example, applications 122 and 124 identified in memory group 128 store information in the encrypted file, and applications 126 and 127 identified in memory group 129 store information in the unencrypted file. Swap device 112 is assigned to memory group 128 and stores data in an encrypted form, and swap device 114 is assigned to memory group 129 and stores data in an unencrypted form. Accordingly, applications 122 and 124, which are included in memory group 128, may store data in an encrypted form, and applications 126 and 127, which are included in memory group 129, may store data in an unencrypted form.

An advantage of not forcing all applications executing in computing device 102 to either use an encrypted swap device or an unencrypted swap device may provide for a reduction in performance overhead and better security. The applications that do not access or process sensitive data have their data stored in an unencrypted form, thus reducing performance overhead because it is unnecessary to encrypt and store their data. Additionally, the sensitive applications may be more secure because they use an encrypted swap device to store their data.

C. Transfer an Application from One Memory Group to Another Memory Group

An application may be transferred from one memory group to another memory group. In an embodiment, swap module 132 receives an indication to transfer application 122 from memory group 128 to memory group 129. In keeping with the above example, applications 122 and 124 identified in memory group 128 store information in an encrypted format, and applications 126 and 127 identified in memory group 129 store information in an unencrypted format. Application 122 belongs to a memory group that stores data in an unencrypted form, and a user may become aware that application 122 processes or accesses sensitive information. The user may be a developer who decides that application 122 should be transferred to another memory group that stores data in an encrypted form. In another example, the user may want to pay less for application 122 in terms of overhead (e.g., CPU cycles or cost to execute application 122 in the cloud) and thus desire to reduce the resources application 122 consumes. The user may decide to transfer application 122 from memory group 128 to 129. The user may interact with a user interface executing in computing device 102 to send an indication to swap module 132 to perform the transfer.

Swap device 112 may be assigned to memory group 128, and swap device 114 may be assigned to memory group 129. Accordingly, applications included in memory group 128 store pages in swap device 112, and applications included in memory group 129 store pages in swap device 114. Swap device 112 is different from swap device 114. To transfer application 122 from memory group 128 to memory group 129, swap module 132 locates and reads all pages not present in memory 110 from swap device 112 to swap device 114. In an example, swap module 132 locates a set of memory pages tied to application 122, where the set of memory pages is stored in swap device 112 and is not present in memory 110. Swap module 132 may copy, based on the indication to transfer, the set of one or more memory pages into swap device 114. To perform the copying of the set of memory pages, swap module 132 may read all the data back into memory 110. Reading all the data back into memory 110, however, may exceed the limit on the amount of swap space that is available to memory group 128. To solve this problem, swap module 132 may gradually read the pages from swap device 112 and write them to swap device 114.

After the set of pages has been written into swap device 114, swap module 132 may transfer application 122 from memory group 128 to memory group 129. After application 122 has been transferred from memory group 128 to memory group 129, application 122 may start to use swap device 114 rather than swap device 112. Swap module 132 may then remove from swap device 112 the set of one or more memory pages that was written to swap device 114.

As discussed above and further emphasized here, FIGS. 1 and 2 are merely examples, which should not unduly limit the scope of the claims. For example, it should be understood that one or more modules may be combined with another module. In an example, swap device selector 130 and swap module 132 are combined into one module. It should also be understood that a module may be separated into more than one module. In an example, swap module 132 is separated into a first swap module and a second swap module.

III. Example Method

Figure 3:
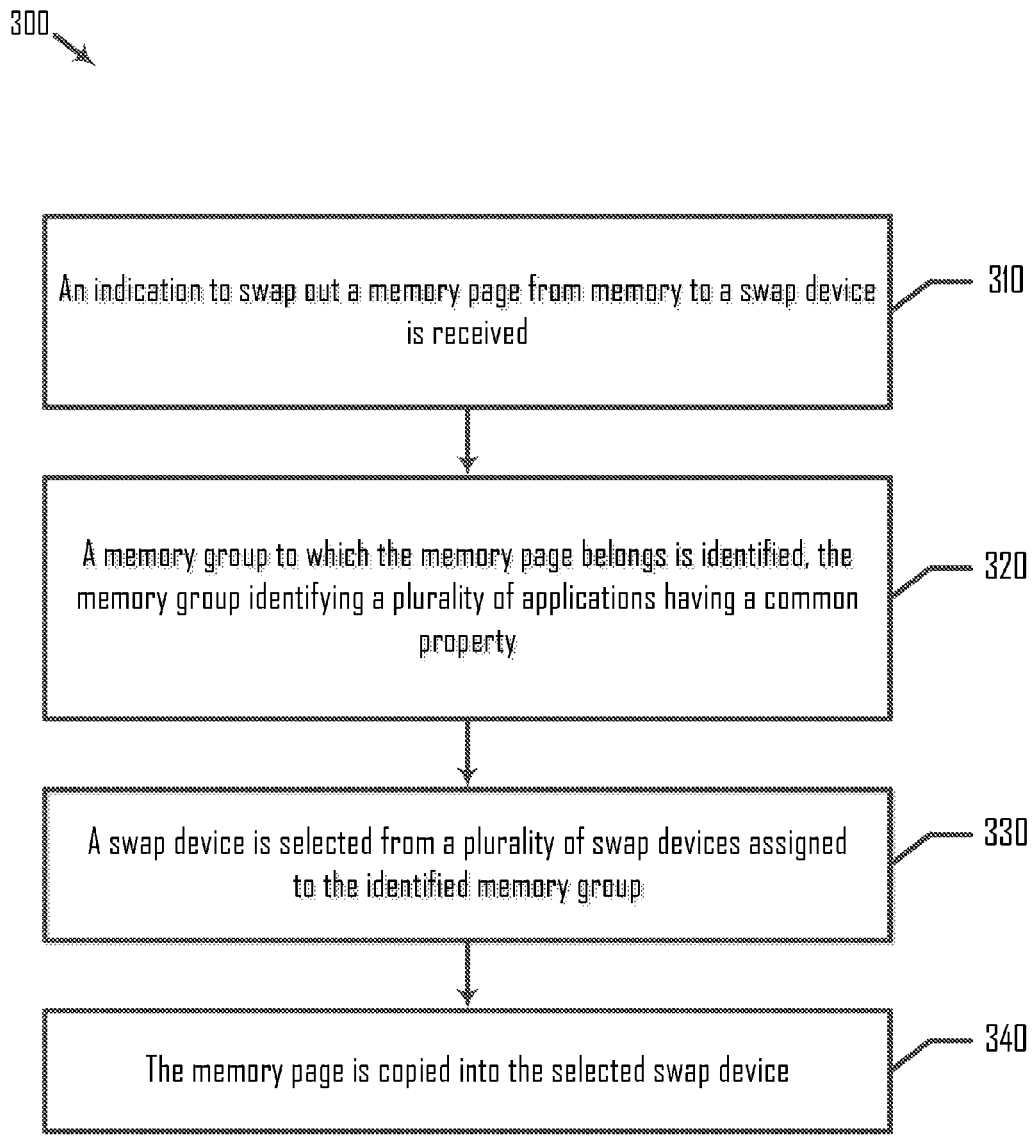
FIG. 3 is a flowchart illustrating a method of swapping a memory page from memory to a swap device, according to an embodiment.

FIG. 3 is a flowchart illustrating a method 300 of swapping a memory page from memory to a swap device, according to an embodiment. Method 300 is not meant to be limiting and may be used in other applications.

Method 300 includes actions 310-340. In an action 310, an indication to swap out a memory page from memory to a swap device is received. In an example, swap device selector 130 receives an indication to swap out page 119 from memory 110 to a swap device. In an action 320, a memory group to which the memory page belongs is identified, the memory group identifying a plurality of applications having a common property. In an example, swap device selector 130 identifies memory group 128 as being a memory group to which page 119 belongs, where memory group 128 identifies applications 122 and 124 as having a common property. In an action 330, a swap device is selected from a plurality of swap devices assigned to the identified memory group. In an example, swap devices 112 and 114 are assigned to memory group 128, and swap device selector 130 selects swap device 112. In an action 340, the memory page is copied into the selected swap device. In an example, swap module 132 copies page 119 into swap device 112.

It is also understood that additional processes may be performed before, during, or after actions 310-340 discussed above. It is also understood that one or more of the actions of method 300 described herein may be omitted, combined, or performed in a different sequence as desired.

IV. Example Computing System

Figure 4:
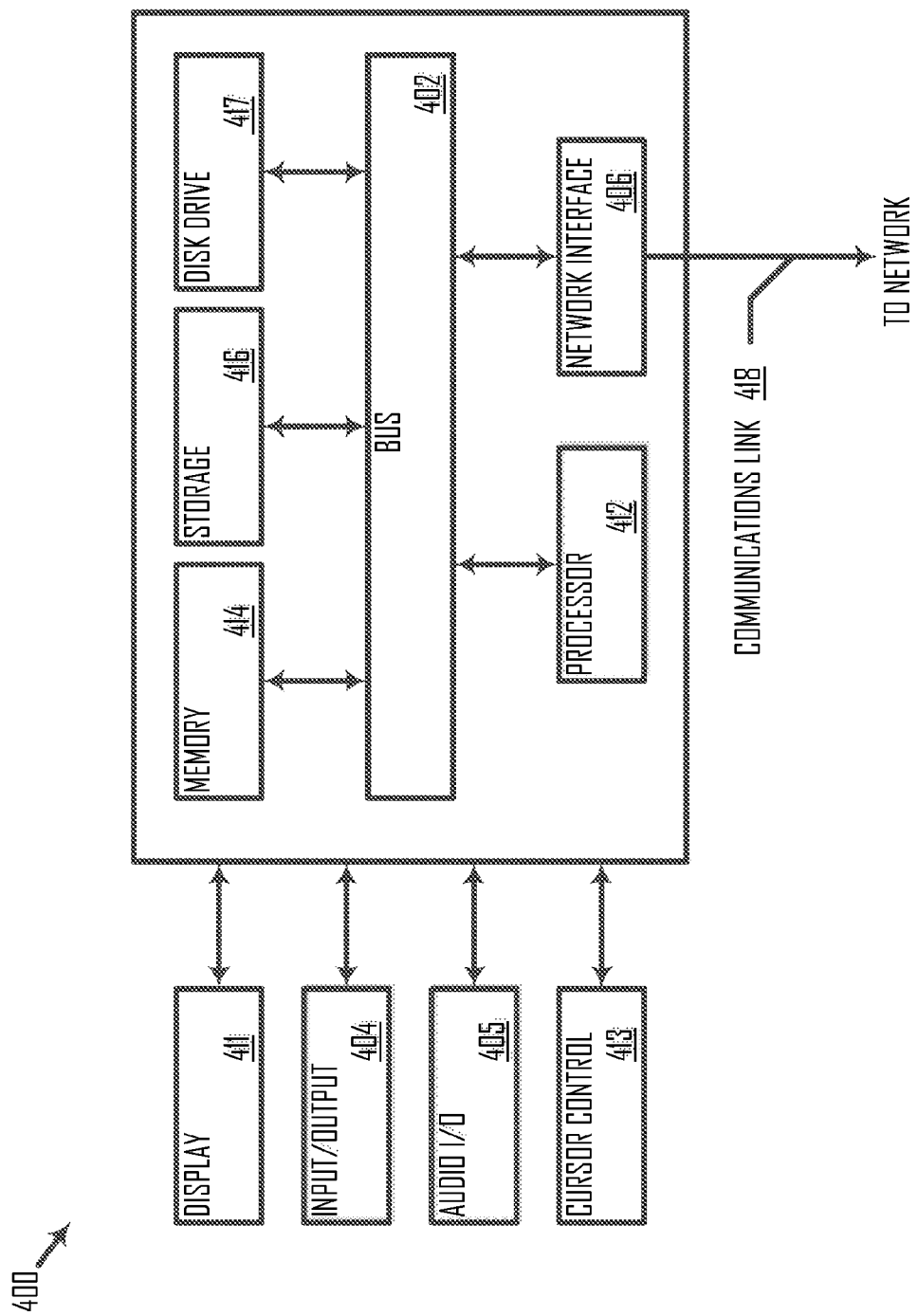
FIG. 4 is a block diagram of an electronic system suitable for implementing one or more embodiments of the present disclosure.

FIG. 4 is a block diagram of a computer system 400 suitable for implementing one or more embodiments of the present disclosure. In various implementations, computing device 102 may include a client or a server computing device that includes one or more processors and may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component such as a display 411, and an input control such as a cursor control 413 (such as a keyboard, keypad, mouse, etc.). An optional audio input/output component 405 may also be included to allow a user to use voice for inputting information by converting audio signals into information signals. Audio I/O component 405 may allow the user to hear audio. A transceiver or network interface 406 transmits and receives signals between computer system 400 and other devices via a communication link 418 to a network. In an embodiment, the transmission is wireless, although other transmission mediums and methods may also be suitable. A processor 412, which may be a microcontroller, digital signal processor (DSP), or other processing component, processes these various signals, such as for display on computer system 400 or transmission to other devices via communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 414, and transmission media includes coaxial cables, copper wire, and fiber optics, including wires that include bus 402. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various action described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of swapping a memory page from memory to a swap device, comprising:
   receiving an indication to swap out a memory page from memory to a swap device;
   identifying a first memory group to which the memory page belongs, the first memory group identifying a first plurality of applications having a first common property, and a second memory group identifying a second plurality of applications having a second common property, wherein an application of the first plurality of applications is identified in the first memory group, but not in the second memory group;
   selecting a swap device from a first plurality of swap devices assigned to the identified memory group, wherein a second plurality of swap devices is assigned to the second memory group and is different from the first plurality of swap devices, and swap devices are assigned per memory group; and
   copying the memory page into the selected swap device.

2. The method of claim 1, wherein each application of the plurality of applications has a memory context.

3. The method of claim 2, further including:
   identifying a memory context to which the memory page belongs, the memory context belonging to one or more memory groups.

4. The method of claim 3, wherein the memory context to which the memory page belongs maps to one or more memory groups, and wherein the identifying a memory group includes identifying the memory group to which the memory context belongs.

5. The method of claim 1, wherein the selecting a swap device includes randomly selecting the swap device from the plurality of swap devices.

6. The method of claim 1, wherein the selecting a swap device includes selecting the swap device with the most available free space of the plurality of swap devices.

7. The method of claim 1, wherein the first memory group uses a swap device that stores data in an encrypted form and the second memory group uses a swap device that stores data in an unencrypted form.

8. The method of claim 1, further including:
   receiving an indication to transfer the application from the first memory group to the second memory group, the first swap device being assigned to the first memory group and a second swap device being assigned to the second memory group, and the first swap device being different from the second swap device;
   locating a set of one or more memory pages that is stored in the first swap device and that is not present in memory; and
   copying, based on the indication to transfer, the set of one or more memory pages into the second swap device.

9. The method of claim 8, further including:
   removing the set of one or more memory pages from the first swap device.

10. The method of claim 1, wherein the swap device is a physical storage device.

11. The method of claim 1, wherein the swap device is a virtual storage device.

12. The method of claim 1, further including:
   receiving an indication to swap out a second memory page from memory to a swap device;
   identifying the second memory page as belonging to the second memory group, wherein an application of the second plurality of applications is identified in the second memory group, but not in the first memory group;
   selecting a second swap device from a second plurality of swap devices assigned to the second memory group; and
   copying the second memory page into the second selected swap device.

13. A system for swapping a memory page from memory to a swap device, comprising:
   a memory to store one or more memory pages;
   a swap device selector that receives an indication to swap out a memory page from memory to a swap device, identifies a first memory group to which the memory page belongs, and selects a swap device from a first plurality of swap devices assigned to the first memory group,
   wherein the first memory group identifies a first plurality of applications having a first common property, wherein a second memory group identifies a second plurality of applications having a second common property, and wherein an application of the first plurality of applications is identified in the first memory group, but not in the second memory group, and wherein a second plurality of swap devices is assigned to the second memory group and is different from the first plurality of swap devices, and swap devices are assigned per memory group; and
   a swap module that copies the memory page into the selected swap device.

14. The system of claim 13, wherein each application of the plurality of applications has a memory context, the swap device selector identifies a memory context to which the memory page belongs, and the memory context belongs to one or more memory groups.

15. The system of claim 14, wherein the memory context to which the memory page belongs maps to one or more memory groups, and wherein the swap device selector identifies the memory group to which the memory context belongs.

16. The system of claim 13, wherein the first memory group uses a swap device that stores data in an encrypted form and the second memory group uses a swap device that stores data in an unencrypted form.

17. The system of claim 13, wherein the swap device is a physical storage device.

18. The system of claim 13, wherein the swap device is a virtual storage device.

19. A non-transitory machine-readable medium comprising a plurality of machine-readable instructions that when executed by one or more processors is adapted to cause the one or more processors to perform a method comprising:
   receiving an indication to swap out a memory page from memory to a swap device;
   identifying a first memory group to which the memory page belongs, the first memory group identifying a first plurality of applications having a first common property, and a second memory group identifying a second plurality of applications having a second common property, wherein an application of the first plurality of applications is identified in the first memory group, but not in the second memory group;
   selecting a swap device from a first plurality of swap devices assigned to the first memory group, wherein a second plurality of swap devices is assigned to the second memory group and is different from the first plurality of swap devices, and swap devices are assigned per memory group; and
   copying the memory page into the selected swap device.

20. The non-transitory machine-readable medium of claim 19, wherein the method further includes:
   receiving an indication to transfer the application from the first memory group to the second memory group, the first swap device being assigned to the first memory group and a second swap device being assigned to the second memory group, and the first swap device being different from the second swap device;
   locating a set of one or more memory pages that is stored in the first swap device and that is not present in memory; and
   copying, based on the indication to transfer, the set of one or more memory pages into the second swap device.

* * * * *